(12) United States Patent
Rink et al.

(10) Patent No.: US 7,153,917 B2
(45) Date of Patent: Dec. 26, 2006

(54) (CO)POLYMERS AND METHOD FOR THE RADICAL (CO)POLYMERIZATION OF OLEFINICALLY UNSATURATE MONOMERS

(75) Inventors: Heinz-Peter Rink, Münster (DE); Hartmut Kagerer, Lünen (DE); Hans-Ulrich Moritz, Bendesdorf (DE)

(73) Assignee: BASF Coatings AG, Munster (DE)

( * ) Notice: Subject to any disclaimer, the term of this patent is extended or adjusted under 35 U.S.C. 154(b) by 107 days.

(21) Appl. No.: 10/512,034

(22) PCT Filed: May 12, 2003

(86) PCT No.: PCT/EP03/04921

§ 371 (c)(1),
(2), (4) Date: Oct. 20, 2004

(87) PCT Pub. No.: WO03/099877

PCT Pub. Date: Dec. 4, 2003

(65) Prior Publication Data

US 2005/0176902 A1    Aug. 11, 2005

(30) Foreign Application Priority Data

May 28, 2002   (DE) ................................ 102 23 651

(51) Int. Cl.
*C08F 2/38* (2006.01)
(52) U.S. Cl. ........................ 526/220; 526/346; 526/917

(58) Field of Classification Search ................ 526/220, 526/288, 346, 917
See application file for complete search history.

(56) References Cited

U.S. PATENT DOCUMENTS

| 2,396,997 | A | * | 3/1946 | Fryling | ........................ 526/223 |
| 4,956,433 | A |   | 9/1990 | Mezger |   |
| 5,189,112 | A | * | 2/1993 | Clouet | ..................... 525/328.2 |

FOREIGN PATENT DOCUMENTS

EP   0 237 792 A1   8/1987

OTHER PUBLICATIONS

Richter, et al., "Isocyanates, Organic" in Kirk-Othmer Encyclopedia of Chemical Technology, J. Wiley & Sons, Inc., pp. 1, 12; online posting date: Dec. 4, 2000.*

* cited by examiner

*Primary Examiner*—Fred Teskin

(57) ABSTRACT

(Co)polymers preparable by free-radical (co)polymerization of olefinically unsaturated monomers in the presence of at least one thiocarbamate-functional organic compound, processes for preparing (co)polymers by free-radical (co)polymerization of olefinically unsaturated monomers, which involves (co)polymerizing the olefinically unsaturated monomers in the presence of at least one thiocarbamate-functional organic compound, and the use of thiocarbamate-functional organic compounds as regulators in the free-radical (co)polymerization of olefinically unsaturated monomers.

7 Claims, No Drawings

(CO)POLYMERS AND METHOD FOR THE RADICAL (CO)POLYMERIZATION OF OLEFINICALLY UNSATURATE MONOMERS

CROSS REFERENCE TO RELATED APPLICATIONS

This application is a National Phase Application of Patent Application PCT/EP2003/004921 filed 12 May 2003, which claims priority to DE 102 23 651.8, filed on 28 May 2002.

The present invention relates to novel (co)polymers preparable by free-radical (co)polymerization of olefinically unsaturated monomers. The present invention further relates to a novel process for free-radical (co)polymerization of olefinically unsaturated monomers in the presence of thiocarbamate-functional compounds. The present invention also relates to the novel use of thiocarbamate-functional compounds as regulators in the free-radical (co)polymerization of olefinically unsaturated monomers.

(Co)polymers of olefinically unsaturated monomers have been known for a long time and are used, for example, as thermoplastics or as important ingredients for coating materials, adhesives, and sealing compounds. As constituents of coating materials, adhesives, and sealing compounds, in their function as binders, they characterize the technological properties of these formulations and also the technological properties of the coatings, adhesive films, and seals produced from them.

In order to realize liquid coating materials, adhesives, and sealing compounds which are easy to apply, have environmental and economic advantages, and possess high solids contents, it is necessary to use binders having a very low number-average and mass-average molecular weight. Their preparation by free-radical (co)polymerization, however, causes problems and cannot be effected without using regulators or chain transfer agents.

As regulators or chain transfer agents it is customary to use thiols or mercaptans. However, these compounds give rise to a severe odor nuisance, which may be manifested unpleasantly even in the (co)polymers and in the coating materials, adhesives, and sealing compounds prepared from them. This problem weighs particularly heavy when, for example, the coating materials are prepared and used on an industrial scale, such as in the OEM finishing of automobiles.

It is an object of the present invention to find new (co)polymers which no longer have the disadvantages of the prior art but which instead can be prepared readily even with low molecular weights and without the odor nuisance associated with the use of regulators or chain transfer agents. The new (co)polymers ought to be suitable in particular as binders for coating materials, adhesives, and sealing compounds which are easy to apply, are environmentally unobjectionable, are free from unpleasant odors, and possess a particularly high solids content.

The new coating materials, adhesives, and sealing compounds ought to give coatings, adhesive films, and seals which are particularly advantageous both economically and technologically.

A further object of the present invention was to find a new process for the free-radical (co)polymerization of olefinically unsaturated compounds which no longer has the disadvantages of the prior art but which instead, in a manner simple and easy to reproduce, provides (co)polymers, especially (co)polymers with low molecular weights, without the occurrence of an odor nuisance.

Yet another object of the present invention was to find new regulators or chain transfer agents for the free-radical (co)polymerization of olefinically unsaturated monomers which no longer have the disadvantages of the prior art and which in particular no longer give rise to any odor nuisance during the preparation of the (co)polymers and their application.

An object of the present invention not least was to find a new use for thiocarbamate-functional organic compounds.

The invention accordingly provides the novel (co)polymers preparable by free-radical (co)polymerization of olefinically unsaturated monomers in the presence of at least one thiocarbamate-functional organic compound, which are referred to below as "(co)polymers of the invention".

The invention also provides the novel process for preparing (co)polymers by free-radical (co)polymerization of olefinically unsaturated monomers, which involves (co)polymerizing the olefinically unsaturated monomers in the presence of at least one thiocarbamate-functional organic compound, and which is referred to below as "process of the invention".

The invention provides not least for the novel use of thiocarbamate-functional organic compounds as regulators in the free-radical (co)polymerization of olefinically unsaturated monomers, this being referred to below as "use in accordance with the invention".

In the light of the prior art it was surprising and unforeseeable for the skilled worker that the object on which the present invention was based could be achieved fundamentally by means of the use in accordance with the invention.

In particular it was surprising that the thiocarbamate-functional organic compounds for use in accordance with the invention have an outstanding regulatory effect in the free-radical (co)polymerization of olefinically unsaturated monomers and do not give rise to any odor nuisance.

It was surprising, moreover, that on the basis of the use in accordance with the invention and of the process of the invention the (co)polymers of the invention were obtained, which were substantially or entirely free from unpleasant odors and possessed outstanding performance properties.

Furthermore, it was surprising that the (co)polymers of the invention were outstandingly suitable as binders for coating materials, adhesives, and sealing compounds, especially for liquid coating materials, adhesives, and sealing compounds having particularly high solids contents of up to 100% by weight (100% systems).

The coating materials, adhesives, and sealing compounds of the invention in question were surprisingly free from unpleasant odors, were easy and economic to apply, and on a wide variety of substrates gave coatings, adhesive films, and seals which were particularly advantageous both economically and technologically.

The thiocarbamate-functional organic compounds for use in accordance with the invention contain at least one, preferably at least two, and in particular two, thiocarbamate groups. The thiocarbamate-functional organic compounds for use in accordance with the invention are referred to below for the sake of brevity as "thiocarbamates".

In addition, the thiocarbamates may contain at least one further functional group. This further functional group is selected such that it does not induce any unwanted secondary reactions and/or does not inhibit the free-radical (co)polymerization of the olefinically unsaturated monomers and/or the regulatory effect of the thiocarbamates. Preferably, the further functional group is selected such that it is able to undergo crosslinking reactions with the crosslinking agents that may be present in the coating materials, adhesives, and sealing compounds of the invention. With particular preference, hydroxyl groups are used as further functional groups.

The thiocarbamates are preferably organic compounds of low molecular mass, i.e., compounds which are not composed of monomer units.

The thiocarbamates are conventional compounds and can be prepared by means of the conventional methods and techniques of organic chemistry. They are preferably prepared by reacting an organic compound containing at least one, preferably at least two, and in particular two, isocyanate group(s) (called "isocyanate" below) with at least one, especially one, thiol.

The isocyanate is preferably selected from the group of the diisocyanates.

Examples of suitable diisocyanates are isophorone diisocyanate (i.e., 5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate, ethylethylene diisocyanate, trimethylhexane diisocyanate, heptamethylene diisocyanate or diisocyanates derived from dimer fatty acids, as sold under the commercial designation DDI 1410 by Henkel and described in patents WO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane, 1,2-, 1,4- or 1,3-bis(4-isocyanatobut-1-yl)cyclohexane, liquid bis(4-isocyanatocyclohexyl)methane with a trans/trans content of up to 30% by weight, preferably 25% by weight, and in particular 20% by weight, as described in patents DE 44 14 032 A1, GB 1 220 717 A1, DE-A-16 18 795 or DE 17 93 785 A1; tolylene diisocyanate, xylylene diisocyanate, tetramethylxylylidene diisocyanate (TMXDI), bisphenylene diisocyanate, naphthylene diisocyanate or diphenylmethane diisocyanate.

Particular preference is given to using aliphatic isocyanates, especially the aliphatic diisocyanates. Aliphatic isocyanates are isocyanates in which the isocyanate groups are attached to aliphatic carbon atoms.

The thiols are preferably monothiols, which where appropriate may also contain at least one of the further functional groups described above.

Examples of suitable thiols are methyl, ethyl, propyl, isopropyl, n-butyl, sec-butyl, tert-butyl, n-pentyl, n-hexyl, cyclohexyl, and phenyl mercaptan and 2-hydroxyethyl, 3-hydroxypropyl, 4-hydroxybutyl, 5-hydroxypentyl, and 6-hydroxyhexyl mercaptan. Particular preference is given to using 2-hydroxyethyl mercaptan (2-mercaptoethanol).

The isocyanates and the thiols can be used in equimolar amounts. Preferably, however, a molar excess of thiols is employed. Unreacted thiols are then separated off after the reaction from the thiocarbamates formed. Examples of suitable separation techniques are extraction, distillation, and filtration.

For the reaction the customary and known apparatus and safety measures are employed, as envisaged for the handling of isocyanates.

For the process of the invention it is possible to use any conventional olefinically unsaturated monomers which can be free-radically (co)polymerized. Examples of suitable olefinically unsaturated monomers are described in detail in German patent application DE 199 30 664 A1, page 4 line 28 to page 9 line 49, or in German patent application DE 100 17 653 A1, page 7 line 64, paragraph [0086], to page 9 line 40, paragraph [0092].

The process of the invention may be conducted conventionally in bulk, solution, emulsion or dispersion. As reactors for the process the conventional stirred tanks, stirred tank cascades, tube reactors, loop reactors or Taylor reactors are suitable, as are described, for example, in patents DE 198 28 742 A1 or EP 0 498 583 A1 or in the article by K. Kataoka in Chemical Engineering Science, Volume 50, number 9, 1995, pages 1409 to 1416. The free-radical copolymerization is preferably conducted in stirred tanks or Taylor reactors, the Taylor reactors being configured such that the conditions of Taylor flow are met along the entire length of the reactor, even if the copolymerization causes the kinematic viscosity of the reaction medium to undergo a sharp change, especially an increase (cf. German patent application DE 198 28 742 A1).

The process of the invention is advantageously conducted at temperatures above room temperature and below the lowest decomposition temperature of the respective monomers used, the temperature range chosen being preferably from 10 to 150° C., with very particular preference from 30 to 120° C., and in particular from 40 to 110° C.

When using particularly volatile monomers the process of the invention may also be conducted under pressure, preferably under from 1.5 to 3000 bar, more preferably from 5 to 1500 bar, and in particular from 10 to 1000 bar.

The molar ratio of thiocarbamates to olefinically unsaturated monomers may vary very widely and is guided by the requirements of the case in hand, in particular by the intended molecular weight of the (co)polymers of the invention. The molar ratio is preferably from $10^{-1}$ to $10^{-4}$, in particular from $10^{-2}$ to $10^{-3}$.

As far as the molecular weight distribution is concerned, no restrictions whatsoever are imposed in the (co)polymers of the invention. Advantageously, however, the process of the invention is conducted so as to give a ratio $M_w/M_n$, measured by gel permeation chromatography using polystyrene as standard, of $\leq 4$, preferably $\leq 2$, and especially $\leq 1.6$.

EXAMPLES

Preparation Example 1

The Preparation of a Thiocarbamate

A glass reaction vessel was charged with 10 g (127.9 mmol) of 2-mercaptoethanol and this initial charge was heated to 40° C. under nitrogen. At this temperature, 1.56 g (6.34 mmol) of tetramethylxylylidene diisocyanate (TMXDI) were added with stirring. The resulting reaction mixture was stirred at 40° C. for 24 hours and then poured into 200 ml of ice-water. The white precipitate was filtered off and washed with deionized water until completely odor-neutral. The precipitate was then dried at room temperature under an oil pump vacuum.

Elemental analysis gave the following composition in % by weight:

| | Element: | | | |
|---|---|---|---|---|
| | N | C | H | S |
| found: | 6.92 | 53.62 | 7.06 | 16.05 |
| calculated: | 6.99 | 53.98 | 7.05 | 16.01 |

The structure of the thiocarbamate was confirmed by nuclear magnetic resonance spectroscopy:

$^{13}$C NMR, 100 MHz, DMSO-$d_6$, δ [ppm]:
30.8 (C-8, C-8', C-9, C-9', primary), 31.66 (C-11, C-11', secondary), 57.33 (C-7, C-7', quaternary), 61.54 (C-12, C-12', secondary), 121.41 (C-2, tertiary), 122.7 (C-4, C-6, tertiary), 127.89 (C-5, tertiary), 147.49 (C-1, C-3, quaternary), 164.38 (C-10, C-10', quaternary).

$^1$H NMR, 400 MHz, DMSO-$d_6$, δ [ppm]: 1.53 (s, 12H, $C^{8,8',9,9'}H_3$), 2.76 (t, 4H, $C^{11,11'}H_2$), 3.39 (q, 4H, $C^{12,12'}H_2$), 4.84 (t, 2H, OH), 7.09–7.12 (m, 2H, $C^{4,6}H$), 7.18–7.22 (m, 1H, $C^5H$), 7.26 (m, 1H, $C^2H$), 8.37 (s, 2H, NH)

Examples 1 to 3 and C1 (C=Comparative)

The Free-radical Polymerization of Styrene in the Absence (Example C1) and in the Presence (Examples 1 to 3) of the Thiocarbamate from Preparation Example 1

General Experimental Protocol

On an analytical balance, the desired amount of the thiocarbamate from preparation example 1 was weighed into a 50 ml Schlenk tube and dissolved in 15 ml of tetrahydrofuran. The styrene solution, containing initiator, was then added under nitrogen. Residual traces of oxygen were removed by evacuating and charging with nitrogen several times. The styrene solution was in each case prepared fresh directly before use. This was done by distilling the styrene under reduced pressure on a column at 30° C. under inert gas, to remove the stabilizer, and then adding azoisobutyronitrile (AIBN) to give a 0.1 molar solution.

For each experimental series, four Schlenk tubes were set up in parallel, their contents differing from one another in terms of the ratio of thiocarbamate to styrene (examples 1 to 3 with thiocarbamate, example C1 without thiocarbamate). The sealed Schlenk tubes were then heated on a water bath at 55° C. for 3 hours. The proportions used were those listed in table 1.

TABLE 1

The amounts of styrene and thiocarbamate used

| Example | Styrene solution (S) [g] | [mmol] | Thiocarbamate (TCA) [g] | [mmol] | TCA/S [molar] |
|---|---|---|---|---|---|
| C1 | 18.02 | 173 | — | — | 0 |
| 1 | 18.06 | 173.4 | 0.2294 | 0.5727 | 3.3 * 10$^{-3}$ |
| 2 | 18.07 | 173.5 | 0.4771 | 1.1911 | 6.9 * 10$^{-3}$ |
| 3 | 18.06 | 173.4 | 0.9324 | 2.3278 | 1.34 * 10$^{-2}$ |

After the end of the polymerization, the reaction mixtures were each poured into 300 ml of cold methanol. The white polymers precipitated were isolated by filtration and dried under reduced pressure. The molar masses of the polystyrenes were determined by means of gel permeation chromatography using polystyrene as standard. The results can be found in table 2.

TABLE 2

Conversion (%), number-average molecular weight $M_n$ [daltons], average degree of polymerization $P_n$, and molecular weight polydispersity $M_w/M_n$

| Example | Conversion | Mn | Pn | Mw/Mn |
|---|---|---|---|---|
| C1 | 7.5 | 143 945 | 1 382 | 1.47 |
| 1 | 7.0 | 75 467 | 725 | 1.53 |
| 2 | 7.2 | 46 244 | 444 | 1.43 |
| 3 | 7.9 | 26 150 | 251 | 1.42 |

The results underline the fact that the thiocarbamate is highly active as a regulator or in transfer agent.

What is claimed is:

1. A (co)polymer comprising a free-radical (co)polymerization product of at least one olefinically unsaturated monomer prepared in the presence of at least one thiocarbamate-functional organic compound comprising a reaction product of an organic compound containing at least one isocyanate group and at least one thiol.

2. The (co)polymer as claimed in claim 1, wherein the thiocarbamate-functional organic compound contains at least one thiocarbamate group.

3. The (co)polymer as claimed in claim 2, wherein the thiocarbamate-functional organic compound contains at least two thiocarbamate groups.

4. A process for preparing the (co)polymer of claim 1 comprising (co)polymerizing the at least one olefinically unsaturated monomer in the presence of the at least one thiocarbamate-functional organic compound.

5. The process as claimed in claim 4, wherein the thiocarbamate-functional organic compound contains at least one thiocarbamate group.

6. The process as claimed in claim 5, wherein the thiocarbamate-functional organic compound contains at least two thiocarbamate groups.

7. A method comprising regulating free-radical (co)polymerization of at least one olefinically unsaturated monomer by adding a thiocarbamate-functional organic compound comprising a reaction product of an organic compound containing at least one isocyanate group and at least one thiol to the (co)polymerization.

* * * * *